United States Patent
Wallash et al.

(10) Patent No.: US 7,595,949 B1
(45) Date of Patent: Sep. 29, 2009

(54) METHOD FOR ACTIVE CANCELLATION OF WRITE-TO-READ CROSSTALK

(75) Inventors: Albert J. Wallash, Morgan Hill, CA (US); Ferruh Gocemen, Paxton, MA (US); Jason Wolfson, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 634 days.

(21) Appl. No.: 11/001,730

(22) Filed: Dec. 2, 2004

Related U.S. Application Data

(63) Continuation-in-part of application No. 10/930,007, filed on Aug. 30, 2004, now abandoned.

(60) Provisional application No. 60/526,798, filed on Dec. 4, 2003.

(51) Int. Cl.
*G11B 5/09* (2006.01)

(52) U.S. Cl. ......................................... 360/46; 360/323

(58) Field of Classification Search ........................ None
See application file for complete search history.

(56) References Cited

U.S. PATENT DOCUMENTS

| | | | | |
|---|---|---|---|---|
| 3,683,515 A * | 8/1972 | Kosaka | ....................... | 434/320 |
| 5,166,914 A * | 11/1992 | Shimada et al. | .......... | 369/47.17 |
| 5,195,003 A * | 3/1993 | Nishimura et al. | .......... | 360/124 |
| 5,243,474 A * | 9/1993 | Mitsuhashi | .................... | 360/70 |
| 5,465,186 A * | 11/1995 | Bajorek et al. | ............... | 360/323 |
| 5,768,228 A * | 6/1998 | Bates et al. | ............... | 369/44.28 |
| 5,777,829 A * | 7/1998 | Voldman et al. | ............. | 360/128 |
| 5,870,239 A * | 2/1999 | Furuya | ........................ | 360/55 |
| 6,134,060 A * | 10/2000 | Ryat | ............................ | 360/46 |
| 6,252,736 B1 * | 6/2001 | Mattison | ....................... | 360/68 |
| 6,339,380 B1 * | 1/2002 | Wilson | ........................ | 340/663 |
| 6,377,411 B1 * | 4/2002 | Katsumata et al. | ............. | 360/46 |
| 6,400,534 B1 * | 6/2002 | Klaassen | ..................... | 360/323 |
| 6,445,039 B1 * | 9/2002 | Woo et al. | .................... | 257/355 |
| 6,538,857 B1 * | 3/2003 | Doss et al. | ................... | 360/323 |
| 6,552,583 B1 * | 4/2003 | Kwong | ........................ | 327/112 |
| 6,807,507 B2 * | 10/2004 | Kumar et al. | ............... | 702/124 |
| 6,891,702 B1 * | 5/2005 | Tang | ........................... | 360/323 |
| 6,972,930 B1 * | 12/2005 | Tang et al. | ............... | 360/234.5 |
| 7,161,772 B2 * | 1/2007 | Iben | ........................... | 360/323 |
| 7,167,331 B1 * | 1/2007 | Sutardja | ....................... | 360/67 |
| 2004/0075955 A1 * | 4/2004 | Ryan et al. | .................. | 360/323 |

\* cited by examiner

*Primary Examiner*—Hoa T Nguyen
*Assistant Examiner*—Dismery E Mercedes
(74) *Attorney, Agent, or Firm*—Mikel R. Boeve

(57) ABSTRACT

A method for preventing electrical overstress from interfering with a magnetic read-write device by identifying one or more characteristic functions of the device that characterize electrical overstress, generating a wave form representative of the electrical overstress by using the one or more characteristic functions and enabling the generated wave form to be combined with a read signal to counteract the electrical overstress. The method can be implemented with a crosstalk cancellation circuit that includes a coupler filter configured to receive signals from the write driver, a differentiator to differentiate the signal, a gain adjust coupled to the coupler filter configured to adjust gain on the received signal, a phase adjust configured to adjust the phase to match the crosstalk, and an inverter coupled to invert the matched signal to enable cancellation of the crosstalk. The cancellation circuit can include two components, a first component that addresses common mode crosstalk and a second component that addresses differential mode crosstalk. The combination is added and inverted to enable cancellation of crosstalk in read components of a device.

30 Claims, 7 Drawing Sheets

METHOD FOR ACTIVE CANCELLATION OF WRITE-TO-READ CROSSTALK

CROSS-REFERENCE TO RELATED APPLICATIONS

This application claims priority to U.S. Provisional Ser. No. 60/526,798, filed Dec. 4, 2003, having the same inventors, and is incorporated herein by reference in its entirety. This application also claims priority to U.S. Ser. No. 10/930,007, filed Aug. 30, 2004, having the same inventors, and is incorporated herein by reference in its entirety.

FIELD OF THE METHOD AND SYSTEM

This method and system relates generally to the field of magnetic recording; and, more particularly, to methods, circuits and systems for actively canceling electrical overstress causing crosstalk in a disk drive recording system.

BACKGROUND OF THE METHOD AND SYSTEM

In the following description, numerous specific details such as currents, frequencies, distances, etc., are set forth in order to provide a thorough understanding of the present method and system. It will be obvious, however, to one skilled in the art that these specific details need not be employed to practice the present method and system. In other instances, well-known circuits, measurements, etc., have not been described in detail in order to avoid unnecessarily obscuring the present method and system.

In a magnetic recording hard drive device, electrical overstress (EOS), also referred to as crosstalk, can damage read heads. More particularly, magnetic recording devices include heads that perform reading and writing of data. Write heads are generally configured to handle higher powers than read heads. Crosstalk results from the combination of two dominant mechanisms. First, inductive coupling can occur directly from a write head to a read head in the form of a differential mode crosstalk pulse. Second, capacitive coupling from a write head interconnect trace to a read head interconnect trace can occur to cause a common mode crosstalk pulse.

Referring to FIG. 1, a schematic representation of a write head 110 and a read head 140 in a magnetic recording system illustrates differential type crosstalk. Magnetic inductive coupling occurs directly from write head 110 to read head 140 inside a slider body (the metal arm and read-write heads that move across the top of a disc) creating a differential mode crosstalk pulse. Specifically, when the write current flowing through read head 140 is quickly changed, the read head 140 experiences some degree of current transients 120 due to the inductive coupling through magnetic coupling 130 between write head 110 and read head 140. Transients 120 show transitions from positive to negative and transitions from negative to positive.

When transitions include write lines switching from positive to negative, crosstalk is positive. When transitions include write lines switching from negative to positive, crosstalk is negative. Thus, inductive coupling follows the direction of a transition whether from positive to negative or vice versa. The polarity may switch depending on whether the magnetic head is facing up or down. Crosstalk current transients 120 in read head 140 can cause repetitive and possibly large temperature excursions in a giant magneto resistive (GMR) sensor. The crosstalk caused by inductive coupling is directly in the head and is proportional to the current. Thus, whatever changes that occur are changed in the head.

Referring now to FIG. 2, the capacitive common mode type crosstalk is illustrated. Capacitive coupling between traces of read head 260 and write head 230 when there is an interaction of write voltages 210 and read voltages 270. Write traces 220 couple to inductive write head 230. Conversely, read traces 270 couple to inductive read head 260. The traces can be close enough in proximity 250 to cause capacitive coupling between positive write traces and negative read traces and between negative write traces and positive read traces. The interaction causes capacitive coupling and a common mode crosstalk pulse. More specifically, the capacitive coupling in the interconnect causes a current that is proportional to the capacitance multiplied by the change in voltage over time. Thus, as hard drives become faster and faster the resulting capacitive crosstalk becomes more of a problem.

The crosstalk caused by capacitive coupling is a common mode crosstalk pulse is in one direction, positive or negative, every time a transition occurs. In capacitive coupling, the common mode voltage on write lines changes in the same way at each transition. As will be appreciated by one of skill in the art of magnetic recording devices, capacitive coupling between write and read lines is dependent on both data rate and amplitude of the common mode voltage. As is known, the crosstalk from capacitive coupling is described as a quantity proportional to the derivative of the common mode voltage with respect to time multiplied by the capacitance caused by the capacitive coupling.

$$Cap.Xtalk \alpha (dVcm)dt * Cap.coupling$$

The trend of new hard drives is toward micro-actuators operating on the position of the head. New head designs could be different from current GMR-type heads and new head technologies could include tunneling heads which are damaged by lower current levels than GMR-type heads. Tunneling heads are at least three times more sensitive than GMR heads. Specifically, it is known that if the crosstalk current significantly exceeds the maximum direct current (DC) level of the bias current, which can be about 4 mA or about 150 mV, then the temperature rise is large enough to cause head degradation and failure. For tunneling-type heads, crosstalk of about 4 mA present in current preamplifiers will damage such advanced head designs. Thus, for future designs to be feasible, it is imperative that crosstalk be reduced from values of between 3 to 9 mA, to as low as 0.5 mA or even below 0.1 mA to prevent unwanted signals to occur.

For voltage control switching with micro-actuators, controlling the head could result in current crosstalk problems preventing a safe environment for tunneling head designs. Moreover, to increase performance in head designs, it is known to apply an overshoot or boost of current when writing to a hard drive. Such overshoot enhances performance by providing increased data rates, at the cost of causing change due to overstress caused by crosstalk.

To resolve crosstalk issues, a differential-type preamplifier can help common mode voltage along interconnects disappear; however, inductive coupling problems remain. Other prior art methods of minimizing crosstalk include increased shielding of traces, and increasing the distances between read and write heads. These prior art methods are unacceptable for addressing crosstalk in hard drive form factors with reduced size and implementing newer technologies. What is needed, therefore, are new methods of addressing crosstalk from write to read components.

SUMMARY OF THE METHOD AND SYSTEM

Embodiments are directed to providing a system and method of canceling write-to-read crosstalk in magnetic recording devices. In a manner suitable for recording devices, such as magnetic read-write devices wherein both inductive and capacitive coupling can occur, a method provides for active cancellation, wherein current and common mode voltages are detected and a wave form is adjusted on the reader that includes a cancellation signal that can change according to the way the wave form changes over time.

An embodiment includes a method for preventing electrical overstress from interfering with magnetic read-write devices and includes identifying a capacitive coupling wave form in the device caused by electrical overstress, identifying an inductive coupling pulse in the device caused by electrical overstress, generating a wave form representative of the combined inductive coupling pulse and the capacitive coupling pulse to represent electrical overstress in the device, and enabling the wave form to be added to the device to counteract the electrical overstress. The electrical overstress can include crosstalk caused by write operations in the magnetic recording device that can degrade a read head in the device due to, for example, the proximity and higher currents during such write operations.

The method can be implemented with a crosstalk cancellation circuit that includes a coupler filter configured to receive signals from the write driver, a differentiator configured to differentiate the signals, a gain adjust coupled to the coupler filter configured to adjust gain on the received signals, a phase adjust coupled to the gain adjust configured to adjust the phase to match the crosstalk, and an inverter coupled to invert the matched signal to enable cancellation of the crosstalk. To create the matched signal, a crosstalk cancellation circuit is provided that includes a coupler filter, a differentiator, a gain adjust and a phase adjust to produce the wave form that matches the electrical overstress. An inverter inverts the matched waveform to create a cancellation waveform. Following the inverter, a summer adds the cancellation waveform to the reader wave form to cancel electrical overstress.

Another embodiment is directed to A crosstalk cancellation circuit that can be coupled to a read-write device. The circuit includes a common mode crosstalk cancellation component, including an averaging block configured to determine an average write signal; a differentiator configured to differentiate the averaged write signal; a phase adjuster configured to match signal phase to capacitive coupling phase; and a coupler filter configured to match frequency domain response of the signal.

The circuit further includes a differential mode crosstalk cancellation component that includes a differential block configured to determine a difference between write signals from a write driver; a phase adjuster configured to match signal phase to capacitive coupling phase; and a coupler filter configured to match frequency domain response of the signal.

The circuit further includes an adder/mixer coupled to the common mode crosstalk cancellation component and the differential mode crosstalk cancellation component to sum the signals.

Another portion of the circuit is a transconductance amplifier coupled to the adder/mixer. The transconductance amplifier receives a voltage representative of the differential and common mode crosstalk summed together and produces an inverted proportional current signal configured to be inserted into a read path of a read head to cancel crosstalk current.

In one embodiment, the circuit includes a precision resistance measurement block configured to determine a resistance of the read head, the precision resistance measurement block being coupled to a preamplifier, the preamplifier configured to amplify a signal generated by the read head, the precision resistance measurement block detecting existence and changes of any resistance in the read head indicative of crosstalk induced in the read head, any changes being communicated to one or more components of the crosstalk cancellation circuit to adapt the current produced by the transconductance amplifier according to the changes.

These and other advantages of the method and system, as well as additional inventive features, will be apparent from the description of the method and system provided herein. This summary is not intended as a comprehensive description of the claimed subject matter but, rather is intended to provide a short overview of some of the matter's functionality. Other systems, methods, features and advantages of the method and system will be or will become apparent to one with skill in the art upon examination of the following figures and detailed description. It is intended that all such additional systems, methods, features and advantages be included within this description, be within the scope of the method and system, and be protected by the accompanying claims.

DESCRIPTION OF THE FIGURES

For a more complete understanding of the present method and system, and the advantages thereof, reference is now made to the following brief descriptions taken in conjunction with the accompanying figures, in which like reference numerals indicate like features.

DETAILED DESCRIPTION OF ILLUSTRATIVE EMBODIMENTS

In the following description, numerous specific details such as currents, frequencies, distances, etc., are set forth in order to provide a thorough understanding of the present method and system. It will be obvious, however, to one skilled in the art that these specific details need not be employed to practice the present method and system. In other instances, well-known circuits, measurements, etc., have not been described in detail in order to avoid unnecessarily obscuring the present method and system.

All references, including publications, patent applications, and patents, cited herein are hereby incorporated by reference to the same extent as if each reference were individually and specifically indicated to be incorporated by reference and were set forth in its entirety herein.

Figure 3:
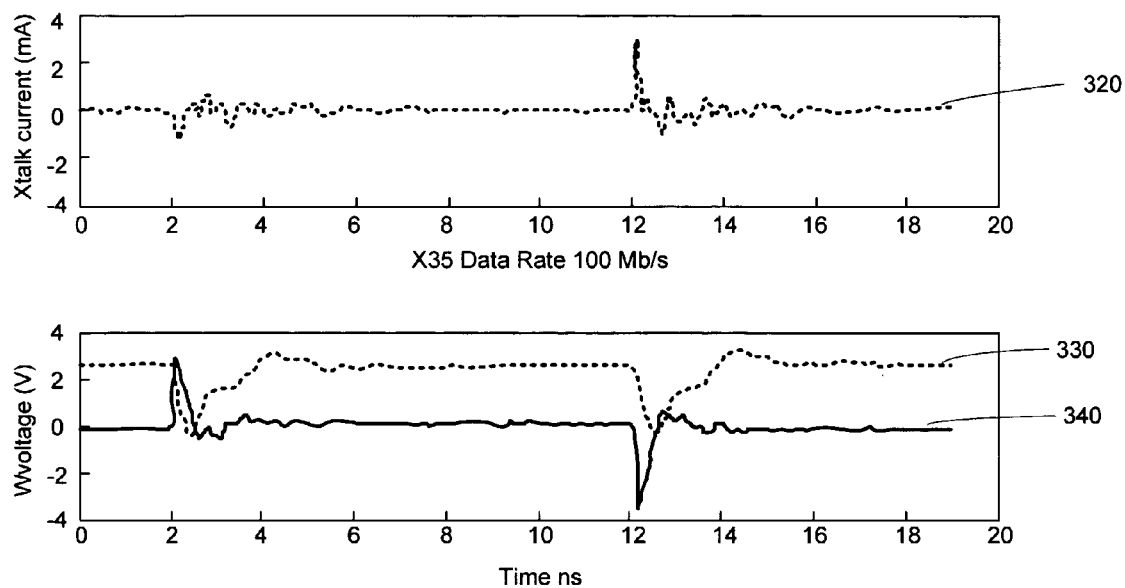
FIG. 3 is a graph illustrating crosstalk occurring due to common mode and differential crosstalk voltages.

Referring now to FIG. 3, a graph illustrates crosstalk for a magnetic drive with a preamplifier and head operating at 100 Mb/s. As shown, crosstalk peaks 320 are asymmetric. The graph illustrated in FIG. 3 illustrates a crosstalk current 320 and an approximation of the magnitude of both the differential crosstalk 340 and common mode crosstalk 330, assuming the same magnitude, shown as approximately 1.5 mA. As shown, the resultant crosstalk on the first pulse 340 is 0 mA resulting from adding a differential of −1.5 mA to a common mode of +1.5 mA. Second pulse 330 is shown as approximately 3 mA, with a differential +1.5 mA, common +1.5 mA. As shown, the common mode voltage on the write traces is the same regardless of the orientation of the written transition.

At higher data rates, such as 1225 Mb/s, the common mode voltage amplitude is greatly reduced, thus resulting in more symmetric crosstalk pulses.

Figure 4:
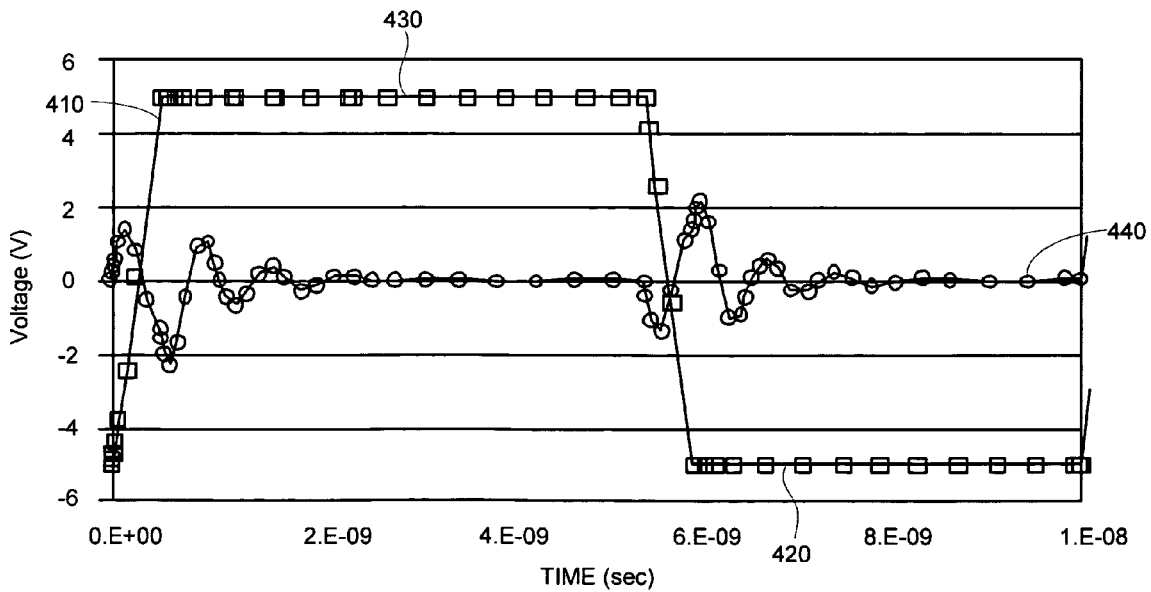
FIG. 4 is a flow diagram illustrating a method according to an embodiment of the present method and system.

Referring now to FIG. 4 a graph of writer crosstalk and the actual writer signal illustrates the signal generated on a read head due to crosstalk. The signal is produced when writer signal 460 is transformed by the circuit shown in FIG. 6. As shown, crosstalk is generated by the change in the write signal.

Figure 1:
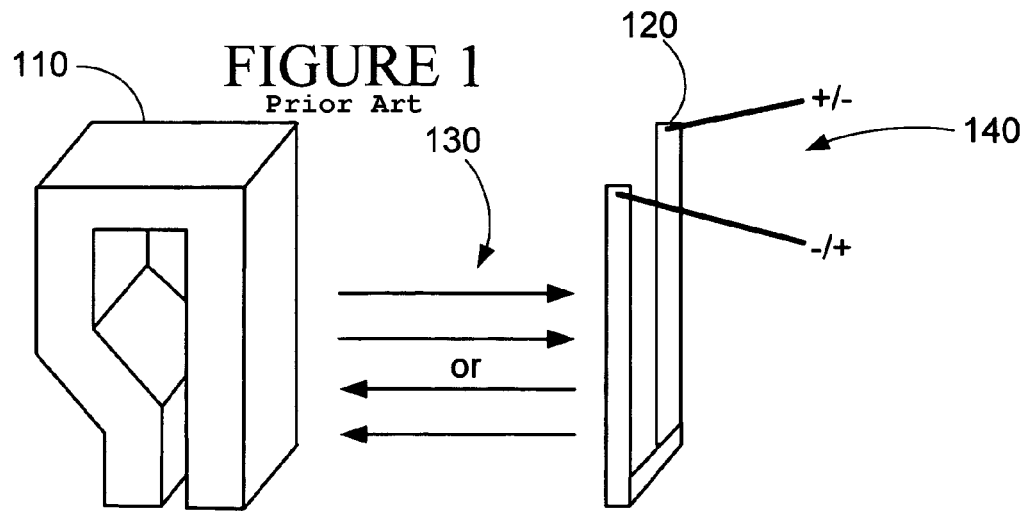
FIG. 1 is a block diagram of read and write heads in a magnetic recording device that supports the claimed subject matter.
Figure 2:
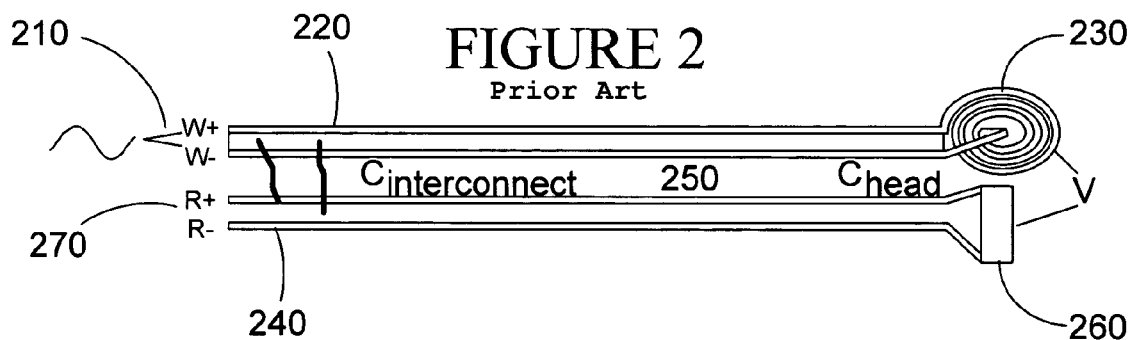
FIG. 2 is a block diagram of read and write heads coupled to positive and negative traces in a magnetic recording device that supports the claimed subject matter.
Figure 5:
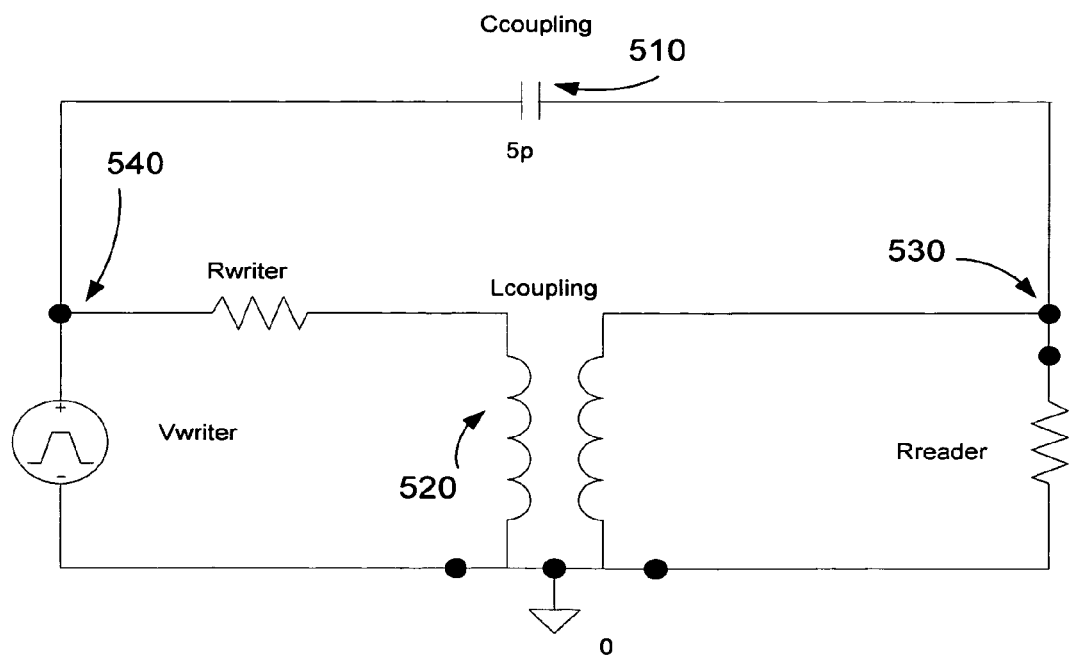

Referring now to FIG. 5, a simplistic schematic diagram 400 illustrates the capacitive and inductive coupling that can occur in a magnetic hard drive. Capacitive coupling is modeled with capacitor 510. Inductive coupling is modeled with inductor 520. The voltage across the reader 530 and writer 540 are illustrated as nodes near resistors, with the crosstalk illustrated as the respective voltages across the reader and writer resistors.

It has been discovered that crosstalk cancellation pulses can be created and adjusted in amplitude, width, and offset to cancel the electrical overstress. In addition, a cancellation pulse shape can be created to adapt according to changes caused by altered data rate.

Figure 6:
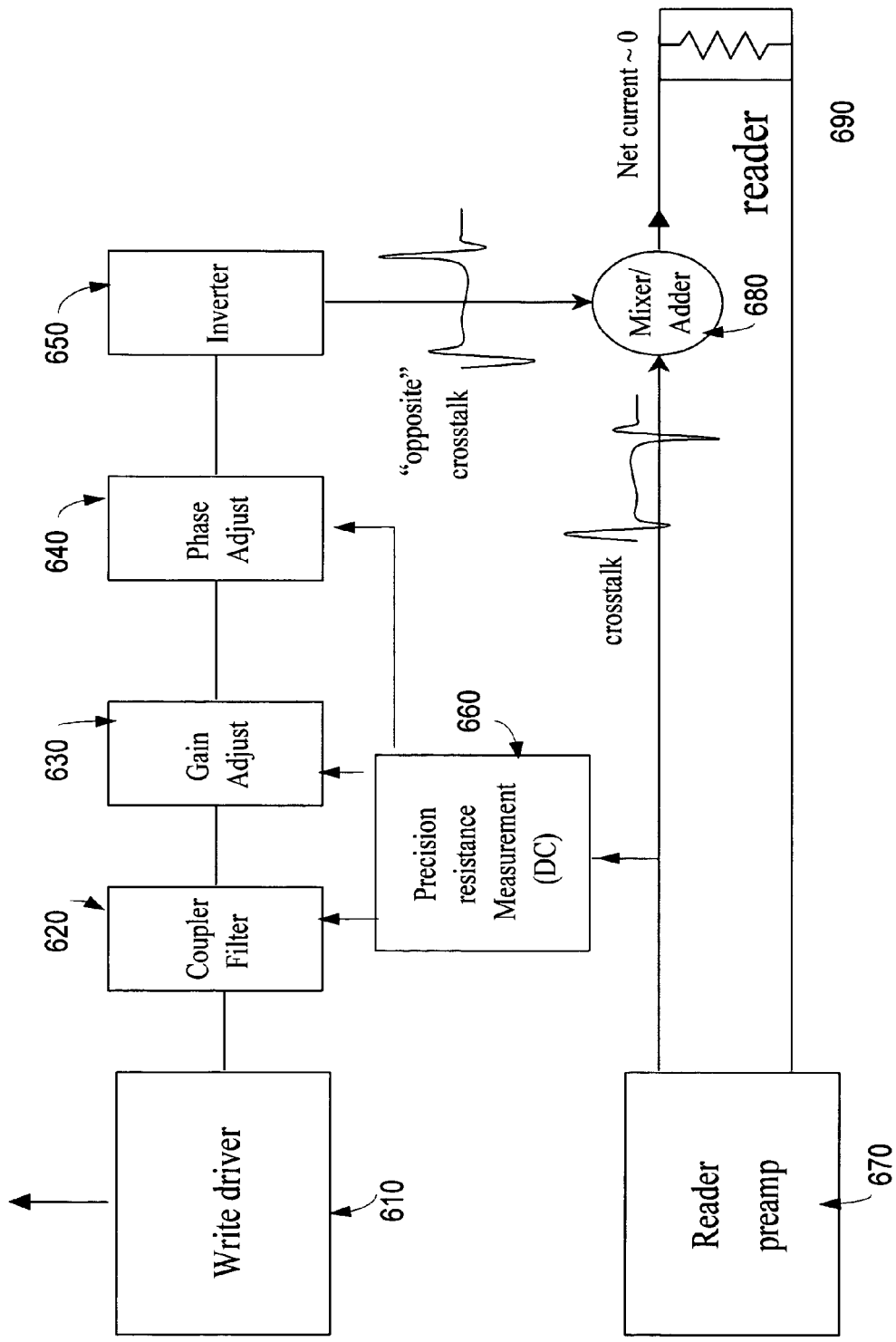
FIG. 6 illustrates a block diagram of an architecture in accordance with an embodiment of a crosstalk cancellation architecture.

Referring now to FIG. 6, a block diagram illustrates an embodiment of such a crosstalk cancellation architecture. More specifically, FIG. 6 shows write driver 610. Write driver 610 provides signals for a write head as well as signals to blocks that are configured to match the crosstalk produced by capacitive and inductive coupling in a magnetic hard drive. More specifically, a wave form from write driver 610 can be created to derive a crosstalk cancellation pulse. The derivation is deduced by taking an average of each of the positive and negative signal components of write driver 610 over time. The average represents a common mode voltage of write driver 610. The blocks, including coupler filter 620, gain adjust 630 and phase adjust 640 each can be configured to produce a matching signal to a crosstalk signal. As will be appreciated, the order of blocks 620, 630 and 640 can be altered and according to system requirements due to the linearity of the system. Coupler filter 620 can be implemented as one of a number of types of coupler filters, either digital or analog, including an IIR type filter, or FIR filter. Inverter 650 inverts the crosstalk matched signal to provide an equal and opposite signal for canceling the crosstalk. The canceling signal is then added at mixer/adder 680 to the signal produced by the crosstalk to produce a net current at the read head 590 of approximately zero.

An issue important to crosstalk cancellation is to know when and if crosstalk is cancelled. There are two methods in accordance with embodiments herein. First, a measurement tool can determine the resistance of the read head to determine whether crosstalk is occurring. Phase and amplitude in a cancellation circuit can be altered to match the crosstalk produced in a hard disk. Another method of determining whether or not a cancellation circuit is working is to measure the peak current following mixer/adder 680. To accomplish this second method, a peak current sensing circuit shown as precision resistance measurement block 660 is shown coupled to preamplifier 670. Preamplifier 670 amplifies the signal generated by the read head. In other embodiments, precision resistance measurement block 660 can added to the circuitry to be used during write phase. Thus, in one embodiment, precision resistance measurement block 660 can be configured to include a switch with a simple transistor, such as a FET, with a single gate to prevent additional significant capacitance to the circuit. To control coupler filter 620, gain adjust 630 and phase adjust 640, precision resistance measurement block 660 operates to determine the resistance of read head 690. The resistance of read head 690 is a function of temperature, which is also a function of the power generated in the read head. Thus, the existence and detection of changes in the resistance in the read head indicate the existence of crosstalk induced in read head. The coupler filter 620 and gain adjust 630 and phase adjust 640 can be adapted to minimize the chance of destructive resistance during a write cycle. This can be done through algorithms known in the art such as a gradient descent type algorithm.

In one embodiment, coupler filter 620 is a high pass filter with an adjustable bandwidth. A high pass topology operates to differentiate the signal being composed to match the crosstalk, just as both the capacitive and inductive coupling operate to differentiate signals.

Figure 7:
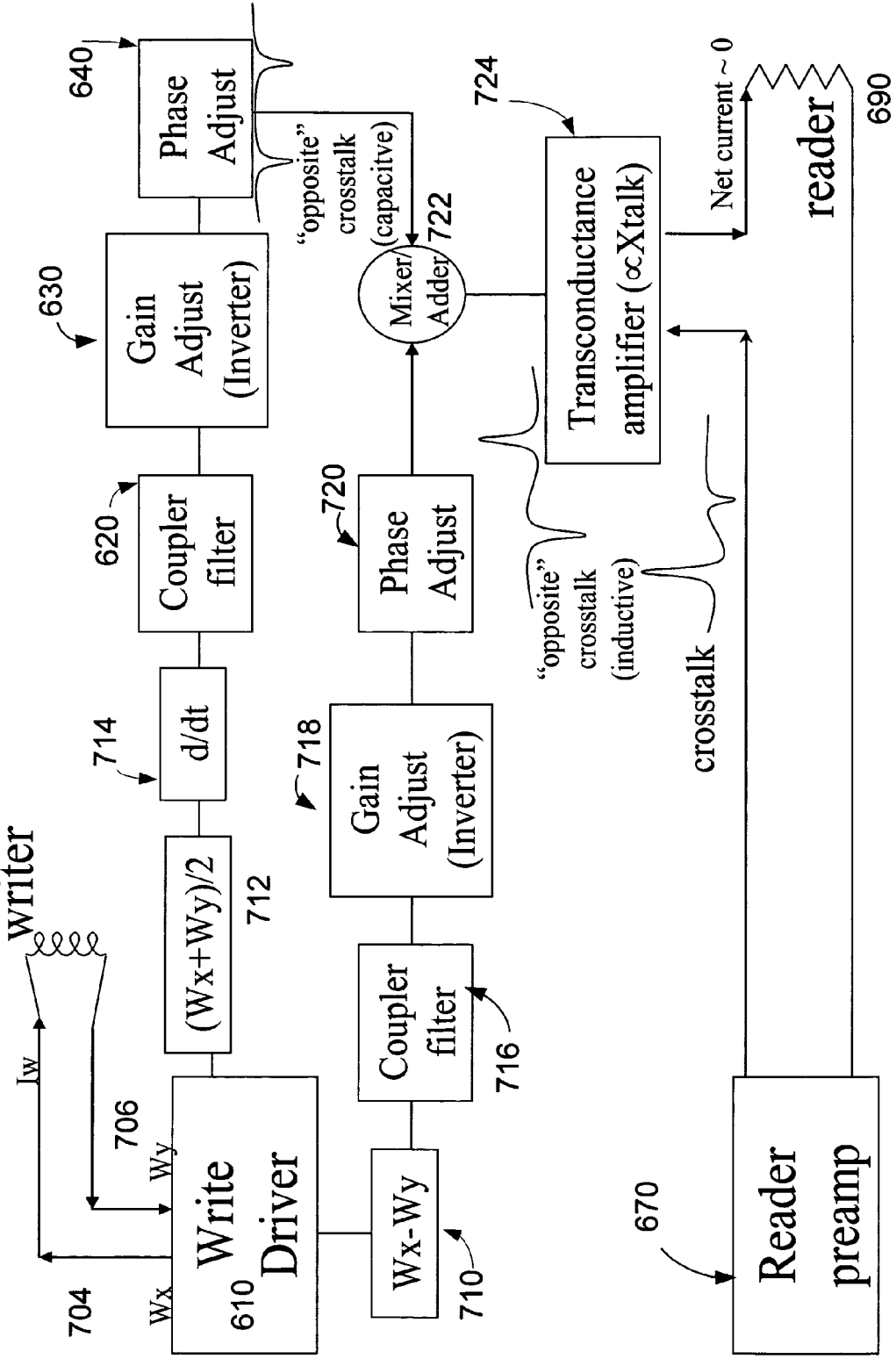
FIG. 7 illustrates a block diagram of an architecture of a crosstalk cancellation architecture in accordance with an embodiment of the present method and system.

Referring now to FIG. 7, another embodiment of the method and system is shown that can be implemented as an enhancement of the crosstalk cancellation circuit shown in FIG. 6. More particularly, the block diagram in FIG. 7 illustrates a method of canceling crosstalk by addressing both capacitive coupling and inductive coupling in a same circuit by recognizing that capacitive coupling is dominated the propagation of a common mode voltage and inductive coupling is dominated by the voltage across the writer coil coupling through the reader element.

Thus, as shown in FIG. 7, capacitive coupling is addressed in blocks 712, 714, 620, 630 and 640, which represents a more specific representation of the signal flow shown in FIG. 6 with the addition of the representation of the signals Wx and Wy coupling write driver 610 to writer 702, shown as signals Wx 704 and Wy 706. Thus, capacitive coupling can be illustrated by taking the average of the signals going to and from writer 702 as shown in block 712. Block 714 illustrates that the differential with respect to time is used to match crosstalk currents for Wx+Wy signals of write driver 610. This is due to the fact that common mode coupling is proportional to the derivative of the capacitive coupling voltage with respect to time.

Another path is illustrated in FIG. 7 configured to match the inductive coupling between read and write heads that acts like a transformer. More specifically, signal 706, Wy voltage is subtracted from signal 704, Wx voltage in block 710. Block 710 illustrates inductive coupling as dominated by the voltage across the writer coil coupling through the reader element. Next, coupler filter 716 receives the signal and filters excessive signals. Coupler filter 716 is illustrated as transmitting signals to gain adjust 718 and phase adjust 720. Gain adjust 718 adjusts the level of the signal received and phase adjust 720 changes the phase by a fixed amount to match the gain and phase of the crosstalk. Mixer adder 722 receives both the output of the first part of the cancellation and the second part of the cancellation circuit representing the capacitive and inductive coupling signals and adds them together. Transconductance amplifier 724 accepts the voltage input from mixer/adder 722 and produces a current output which is proportional to the voltage input. Transconductance amplifier 724 is inserted into the circuit formed by the read head 690 and reader preamplifier 670 to cancel current generated by crosstalk.

Figure 8:
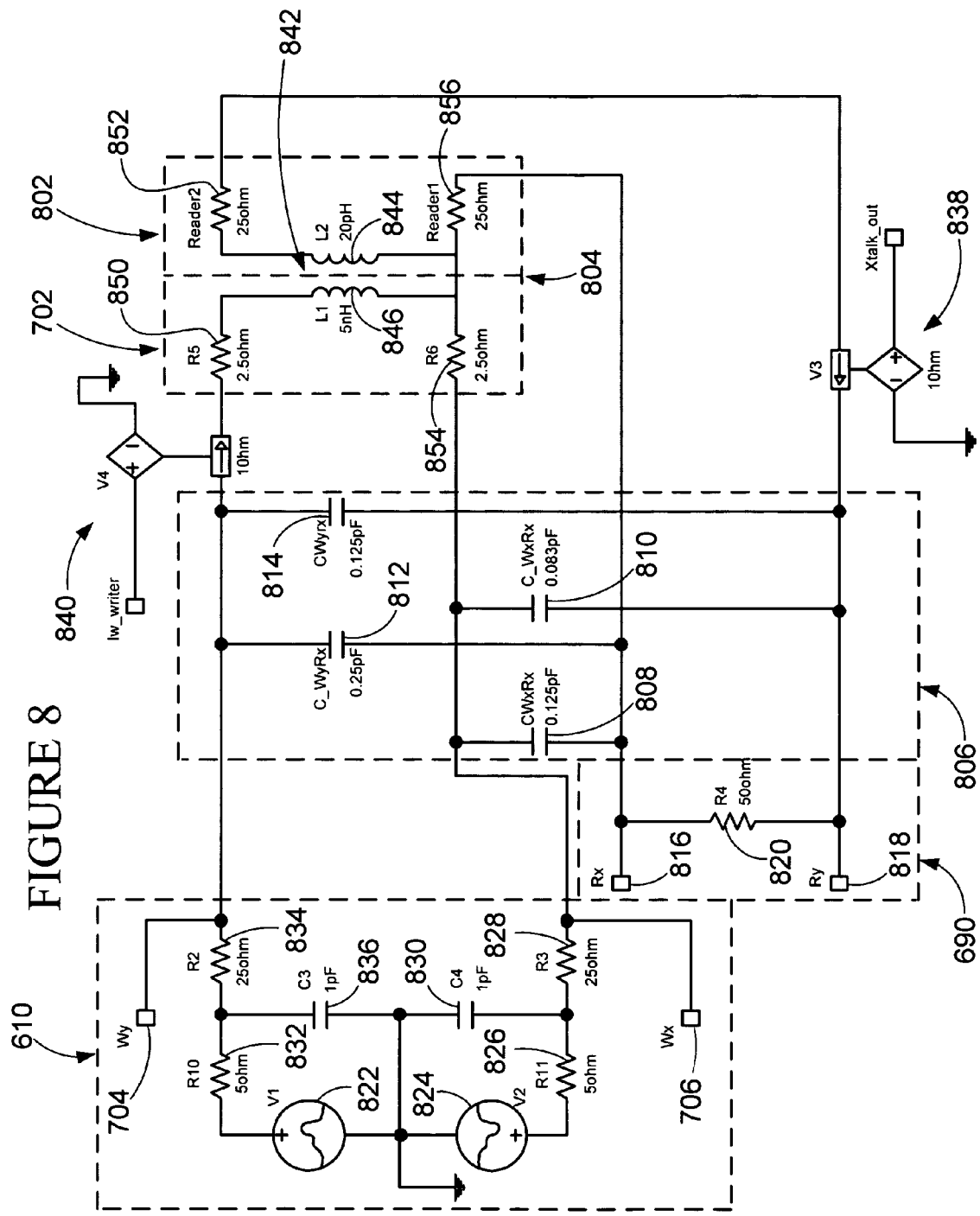
FIG. 8 is a schematic diagram illustrating components of a hard drive including read and write heads without cancellation of crosstalk circuitry.

Referring now to FIG. 8, a schematic block diagram models a write head 702, read head 802 and preamplifier 610, reader 690 and includes coupling components, inductive coupling 804 and capacitive coupling 806. Capacitive coupling modeling includes capacitors 808, 810, 812, and 814 which are coupled in parallel with Rx read trace 816 and Ry read trace 818. Reader preamplifier 690 inputs are modeled using resistor 820 as a load resistor.

Similarly, write driver 610 is modeled as a power amplifier with voltage sources 822 and 824 coupled to resistors 826, 828, representing input load for source 824, and resisters 832 and 834 representing input load for source 822. Capacitors 830 and 836 are shown representing input capacitance. The read head 802 and write head 702 are modeled by coupling a voltage control current source 840 to a combination of inductor 846 with resistive load shown by resistors 854 and 850, for write head 702; and inductor 844 coupled to resistive load shown by resistors 852 and 856, for read head 802. Inductive coupling 804 is represented by the inductors 844 and 846, which have a virtual ground 842 there between. To model the crosstalk created, a voltage controlled current source 838 is shown coupled to reader 690.

Figure 9:
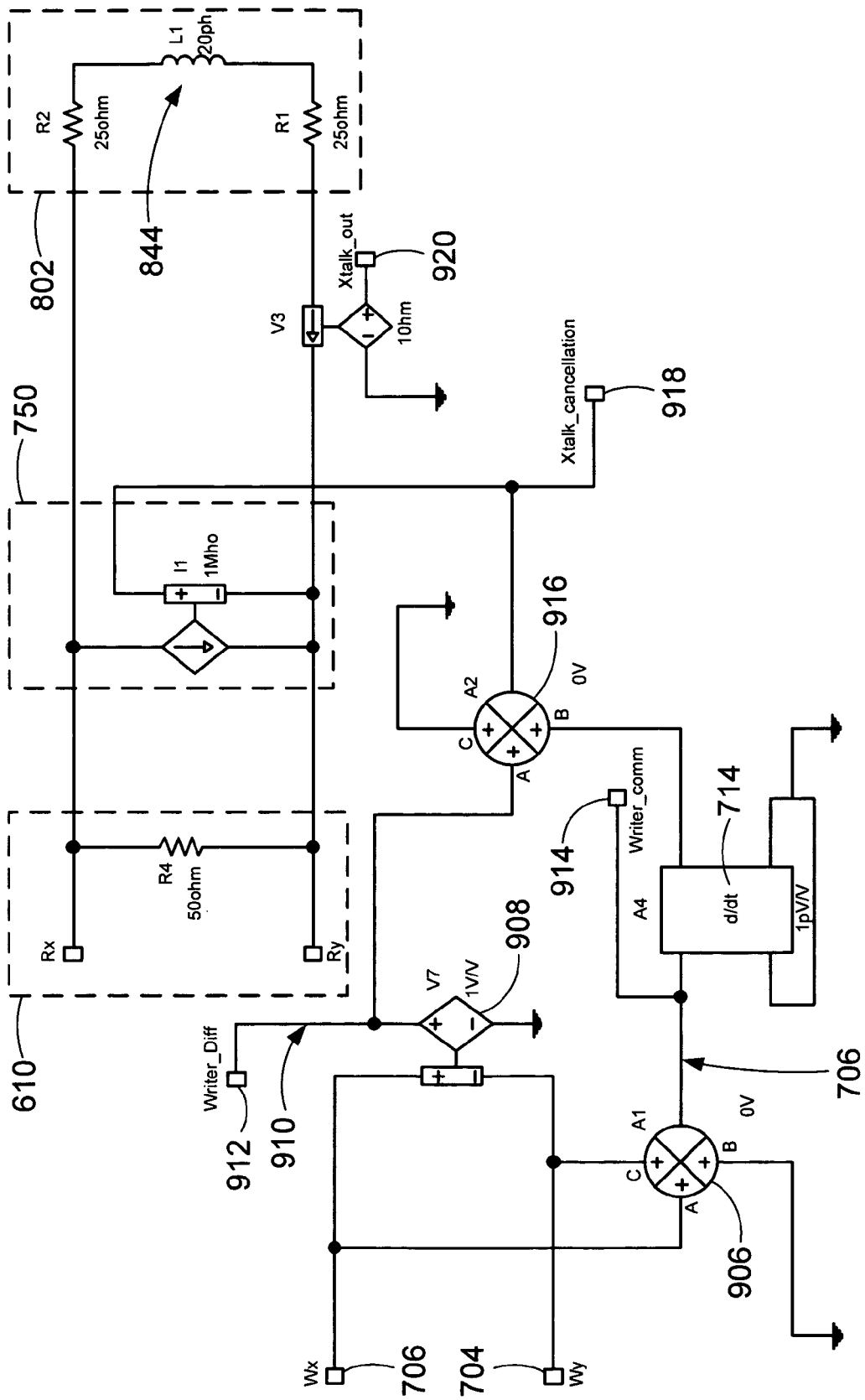
FIG. 9 is a schematic diagram illustrating components of a hard drive including read and write heads with cancellation of crosstalk circuitry included according to an embodiment of the present method and system.

Referring now to FIG. 9, a schematic model of an embodiment of the present method and system illustrates blocks shown in FIG. 7. The schematic model includes crosstalk cancellation circuitry as shown in FIG. 7 as is described further below. Write signals Wx 706 and Wy 704 control voltage controlled voltage source (VCVS) 908. VCVS 908 is controlled by the difference Wx-Wy which is recognized as the differential write voltage 910. This signal is multiplied by a constant A in summer 916. A is chosen to produce a signal which is equal and opposite of the inductive differential coupling between the write and read heads.

Wx 706 and Wy 104 also feed summer 906 which forms the signal 904 which is Wx+Wy. This signal is twice the common mode write voltage. Signal 904 is then differentiated by differentiator 714 to form signal 914. This signal is multiplied by a constant B by summer 916. B is chosen to produce a signal which is equal and opposite to the signal produced by the capacitive common mode coupling.

The signals 910 and 914 after weighting by A and B respectively are summed in summer 916 to produce signal 918. Signal 918 controls voltage controlled current source 750. Voltage controlled current source 750 is connected in parallel with read head 802. Read head 802 generates signal 920, modeled by voltage controlled current source 922. Read head 802 is connected in parallel with voltage controlled current source 750. The current produced by current source 750 is ideally equal and opposite to current produced by the crosstalk modeled by current source 922, which is generated during write operations. The current generated from 750 cancels the current generated from crosstalk and therefore drastically reduces the unwanted power dissipated in the read head.

Figure 10:
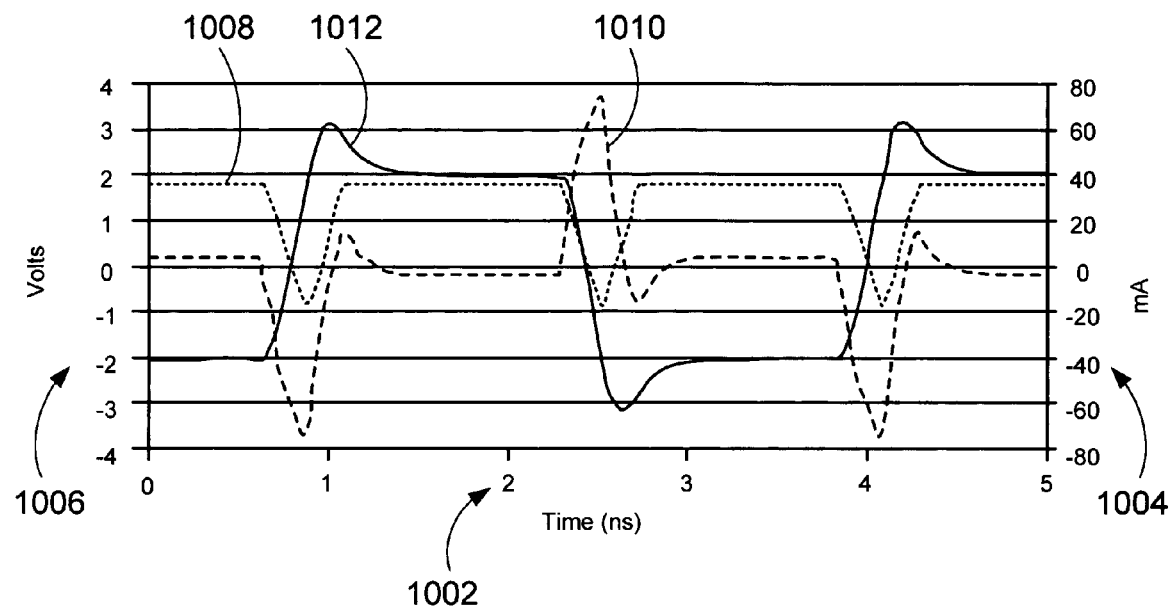
FIG. 10 is an exemplary graph illustrating capacitive and inductive crosstalk and write current in a hard drive.
Figure 11:
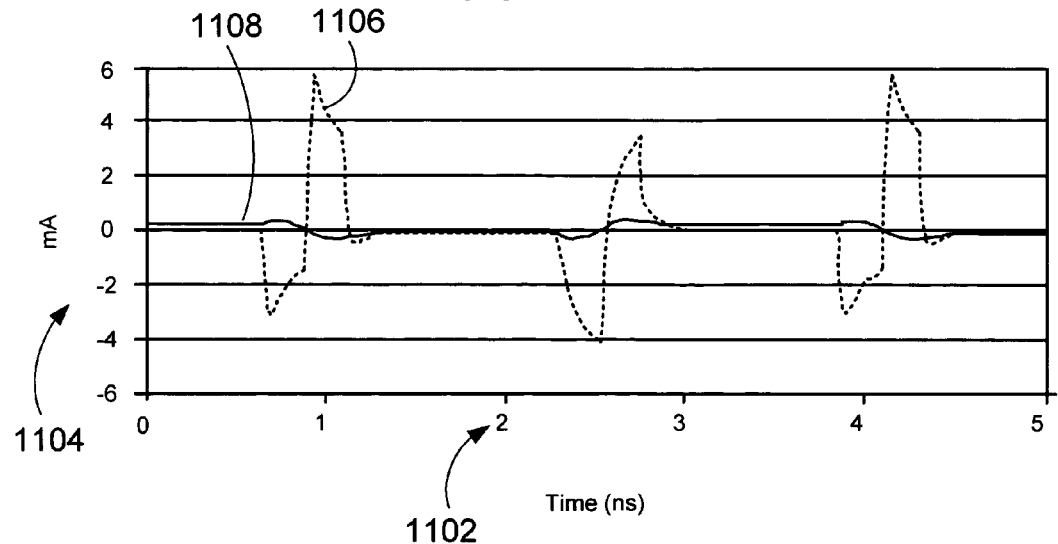
FIG. 11 is an exemplary graph illustrating the capacitive and inductive crosstalk and write current following cancellation of the crosstalk in accordance with an embodiment of the present method and system.

Referring now to FIG. 10, a graph represents an illustration of the common and differential mode coupling resulting in crosstalk as compared to the current in the write head. Specifically, the graph illustrates axes time 1002 versus current, shown in mA for the write head current; and illustrates axis voltage 1006 versus time 1002 for crosstalk voltages. The signals include signal 1008 showing common mode coupling, signal 1010 showing differential mode coupling and signal 1012 showing write head current. The graph illustrates the differential and common mode coupling and current in the write head prior to crosstalk cancellation. As shown, crosstalk prior to cancellation approaches four volts due to differential crosstalk; and varies between two volts and negative one volt for common mode crosstalk coupling. Referring to FIG. 11, a graph illustrates crosstalk before and after cancellation.

The method and system is operational with numerous other general purpose or special purpose computing system environments or configurations. Examples of well known computing systems, environments, and/or configurations that may be suitable for use with the method and system include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Preferred embodiments of this method and system are described herein, including the best mode known to the inventors for carrying out the method and system. Variations of those preferred embodiments may become apparent to those of ordinary skill in the art upon reading the foregoing description. The inventors expect skilled artisans to employ such variations as appropriate, and the inventors intend for the method and system to be practiced otherwise than as specifically described herein. Accordingly, this method and system includes all modifications and equivalents of the subject matter recited in the claims appended hereto as permitted by applicable law. Moreover, any combination of the above-described elements in all possible variations thereof is encompassed by the method and system unless otherwise indicated herein or otherwise clearly contradicted by context.

What is claimed is:

1. A method for preventing electrical overstress from interfering with a magnetic read-write device, the method comprising:
   identifying one or more characteristic functions of the device that characterize electrical overstress;
   generating a wave form representative of the electrical overstress by using the one or more characteristic functions; and
   enabling the generated wave form to be combined with a read signal to counteract the electrical overstress, wherein the generated wave form is a combination of a common mode component and a differential mode component, each of the common mode and differential mode components operated on separately, wherein the identifying and generating steps are implemented in two parts, a first part receiving a write signal representative of capacitive coupling in the device used to generate the differential mode component of the generated wave form, and a second part receiving a write signal representative of inductive coupling in the device used to generate the common mode component of the generated wave form, each of the first and second parts including a gain adjusting step to adjust an amplitude level of the write signal, a phase adjusting step to change a phase of the write signal by a fixed amount and a filtering step to filter excessive signals from the write signal.

2. The method of claim 1 wherein the characteristic function is a transfer function modeling one or more of capacitive coupling and inductive coupling in the device.

3. The method of claim 1 wherein the common mode and differential mode components are operated on using characteristic functions that correspond to the electrical overstress.

4. The method of claim 1 wherein the generated wave form takes into account an operation data rate of the device.

5. The method of claim 1 wherein the magnetic read-write device is a hard drive.

6. The method of claim 1 wherein the generated wave form is an inverted signal to enable the wave form to counteract the electrical overstress.

7. The method of claim 1 wherein the generated wave form is formed by using write signals from a write driver and applying a transfer function to model the electrical overstress from capacitive coupling in the device, the transfer function being proportional to the derivative of the common mode voltage of the write driver with respect to time multiplied by the capacitance caused by the capacitive coupling.

8. The method of claim 7 wherein the transfer function includes:
determining the derivative of the common mode voltage of the write signal with respect to time; and
multiplying by a constant representative of electrical overstress caused by the capacitive coupling.

9. The method of claim 1 wherein the magnetic read-write device includes a crosstalk cancellation circuit including at least two coupler filters, a differentiator, at least two gain adjusters and at least two phase adjusters to produce the generated wave form that matches the electrical overstress.

10. The method of claim 1 wherein the magnetic read-write device is a hard drive on a computer system.

11. A system for counteracting crosstalk in a magnetic read-write device, the system comprising:
a write driver configured to provide signals to a write head;
a crosstalk cancellation circuit coupled to the write driver, the crosstalk cancellation circuit including:
a coupler filter configured to receive signals from the write driver;
a differentiator configured to match crosstalk currents of the signals from the write driver by determining a differential with respect to time for at least two signals from the write driver;
a gain adjust coupled to the coupler filter configured to adjust gain on the received signals;
a phase adjust coupled to the gain adjust configured to adjust the phase to match the crosstalk; and
an inverter coupled to invert the matched signal to enable cancellation of the crosstalk,
wherein the coupler filter, the gain adjust and the phase adjust are adapted to minimize power dissipated in a read head during a write cycle,
wherein the crosstalk cancellation circuit is implemented in two parts, a first part receiving a write signal representative of capacitive coupling in the device, and a second part receiving write signals representative of inductive coupling in the device, each of the first and second parts including a gain adjust, phase adjust and coupler filter.

12. The system of claim 11 wherein the coupler filter is implemented as one or more of a digital filter, analog filter, infinite impulse response filter and finite impulse response filter.

13. The system of claim 11 wherein the coupler filter is a high pass filter with an adjustable bandwidth.

14. The system of claim 11 wherein the coupler filter is adjusted during one or more of once at manufacture and according to an automatic adjustment feedback during operation of a hard drive.

15. The system of claim 11 wherein the crosstalk cancellation circuit is coupled to a summer to add the inverted matched signal to a read signal, the inverted matched signal enabling a near zero net current at a read head of the magnetic read-write device.

16. The system of claim 11 wherein the adaptation to minimize the power dissipated in the read head is accomplished through a gradient descent algorithm.

17. The system of claim 11 wherein the crosstalk cancellation circuit further includes a precision resistance measurement block configured to determine a resistance of a read head.

18. The system of claim 17 wherein the precision resistance measurement block is coupled to a preamplifier, the preamplifier configured to amplify a signal generated by the read head, the precision resistance measurement block detecting existence and changes of any resistance in the read head indicative of crosstalk induced in the read head.

19. A method for preventing electrical overstress from interfering with a magnetic read-write device, the method comprising:
generating a signal representative of any inductive coupling and capacitive coupling signals present on a read head of the magnetic read-write device;
inverting the generated signal; and
adding the inverted signal to the read head to counteract the electrical overstress,
wherein the electrical overstress is caused by capacitive and inductive coupling in the magnetic read-write device caused via write components,
wherein the generating step is implemented in two parts, a first part receiving a write signal representative of capacitive coupling in the device, and a second part receiving write signals representative of inductive coupling in the device, each of the first and second parts including a gain adjusting step to adjust an amplitude level of the write signal, a phase adjusting step to change a phase of the write signal by a fixed amount and a filtering step to filter excessive signals from the write signal.

20. The method of claim 19 wherein generating the signal includes:
receiving write signals generated by a write driver; and
applying a transfer function representative of electrical overstress on the read head.

21. The method of claim 19 wherein the method for preventing electrical overstress is enabled via a crosstalk cancellation circuit, the circuit including at least two filters, a differentiator, at least two gain adjusters, and at least two phase adjusters, the circuit configured to minimize the overstress during a write cycle of the device.

22. The method of claim 21 wherein the circuit applies a gradient descent algorithm.

23. The method of claim 21 wherein the filter is a high pass filter with an adjustable bandwidth.

24. The method of claim 21 wherein the filter operates to differentiate a signal being composed to match the electrical overstress on a hard drive.

25. A computer system comprising:
a processor;
a memory coupled to the processor; and
a magnetic read-write device coupled to the processor, the magnetic read-write device including a crosstalk cancellation circuit coupled to a write driver, the crosstalk cancellation circuit including linear components including:
a coupler filter configured to receive signals from the write driver;
a differentiator configured to match crosstalk currents of the signals from the write driver by determining a differential with respect to time for at least two signals from the write driver;
a gain adjust configured to adjust gain on the received signals;
a phase adjust coupled to the gain adjust configured to adjust the phase to match crosstalk; and
an inverter coupled to invert the matched signal to enable cancellation of the crosstalk,
wherein the crosstalk cancellation circuit is implemented in two parts, a first part receiving a write signal representative of capacitive coupling in the device, and a second part receiving write signals representative of inductive coupling in the device, each of the first and second parts including a gain adjust, phase adjust and coupler filter and further includes a precision resistance measurement block configured to determine a resistance of a read head.

26. The computer system of claim 25 wherein the coupler filter is implemented as one or more of a digital filter, analog filter, infinite impulse response filter and finite impulse response filter.

27. The computer system of claim 25 wherein the coupler filter is a high pass filter with an adjustable bandwidth.

28. The computer system of claim 25 wherein the coupler filter is adjusted during one or more of once at manufacture and according to an automatic adjustment feedback during operation of a hard drive.

29. The computer system of claim 25 wherein the crosstalk cancellation circuit is coupled to an adder to add the inverted matched signal to the crosstalk, the inverted matched signal enabling a near zero net current at a read head of the magnetic medium.

30. The computer system of claim 25 wherein the precision resistance measurement block is coupled to a preamplifier, the preamplifier configured to amplify a signal generated by the read head, the precision resistance measurement block detecting existence and changes of any resistance in the read head indicative of crosstalk induced in the read head.

* * * * *

UNITED STATES PATENT AND TRADEMARK OFFICE
CERTIFICATE OF CORRECTION

PATENT NO. : 7,595,949 B1
APPLICATION NO. : 11/001730
DATED : September 29, 2009
INVENTOR(S) : Wallash et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Twenty-eighth Day of September, 2010

David J. Kappos
*Director of the United States Patent and Trademark Office*